(12) United States Patent
Cappelletti et al.

(10) Patent No.: US 12,447,936 B2
(45) Date of Patent: Oct. 21, 2025

(54) AUTOMATIC CONTROLLED BRAKE-BY-WIRE BRAKING SYSTEM FOR MOTORCYCLES

(71) Applicant: FRENI BREMBO S.P.A., Curno (IT)

(72) Inventors: Luca Cappelletti, Curno (IT); Samuele Mazzoleni, Curno (IT); Andrea Belloni, Curno (IT)

(73) Assignee: Brembo S.p.A., Curno (IT)

( * ) Notice: Subject to any disclaimer, the term of this patent is extended or adjusted under 35 U.S.C. 154(b) by 581 days.

(21) Appl. No.: 17/277,746

(22) PCT Filed: Sep. 16, 2019

(86) PCT No.: PCT/IB2019/057769
§ 371 (c)(1),
(2) Date: Mar. 19, 2021

(87) PCT Pub. No.: WO2020/058819
PCT Pub. Date: Mar. 26, 2020

(65) Prior Publication Data
US 2021/0370897 A1    Dec. 2, 2021

(30) Foreign Application Priority Data

Sep. 19, 2018  (IT) .................. 102018000008726

(51) Int. Cl.
*B60T 8/40*  (2006.01)
*B60T 8/17*  (2006.01)
(Continued)

(52) U.S. Cl.
CPC ........ *B60T 8/1706* (2013.01); *B60T 8/17554* (2013.01); *B60T 8/17616* (2013.01);
(Continued)

(58) Field of Classification Search
CPC ............... B60T 8/1706; B60T 8/17554; B60T 8/17616; B60T 8/3225; B60T 2250/00;
(Continued)

(56) References Cited

U.S. PATENT DOCUMENTS 5,823,636 A * 10/1998 Parker ................... B60T 13/741
                                                    188/106 P
6,390,566 B1 * 5/2002 Matsuno .................... B60T 8/26
                                                    303/9.72
(Continued)

FOREIGN PATENT DOCUMENTS

CN     101024396 A     8/2007
CN     101780796 A     7/2010
(Continued)

OTHER PUBLICATIONS

European Patent Office, International Search Report with Written Opinion, issued in PCT/IB2019/057769, Jan. 7, 2020, 11 pages, European Patent Office, Rijswijk, Netherlands.

(Continued)

*Primary Examiner* — Bradley T King
(74) *Attorney, Agent, or Firm* — Marshall & Melhorn, LLC

(57) ABSTRACT

A braking system for motorcycles may have a first manual actuator device selectively connectable to at least a first braking device and/or at least a second braking device. The first manual actuator device may be provided with a hydraulic supply circuit that can be selectively connected to a hydraulic input circuit of at least one of the braking devices. The system may also have at least one electro-hydraulic automatic actuator device and at least one electromechanical automatic actuator device. The system may also have a single control unit operatively connected to the control valve, to the at least one electro-hydraulic automatic actuator device, to the at least one electromechanical automatic (Continued)

actuator device and to the first manual actuator device to operate the electro-hydraulic and electromechanical automatic actuator devices and the control valve according to the configuration of the first manual actuator device and/or according to the dynamics of the motorcycle.

21 Claims, 4 Drawing Sheets

(51) Int. Cl.
  *B60T 8/1755* (2006.01)
  *B60T 8/1761* (2006.01)
  *B60T 8/32* (2006.01)

(52) U.S. Cl.
  CPC ......... *B60T 8/3225* (2013.01); *B60T 2250/00* (2013.01); *B60T 2270/402* (2013.01); *B60T 2270/404* (2013.01); *B60T 2270/82* (2013.01)

(58) Field of Classification Search
  CPC ......... B60T 2270/402; B60T 2270/404; B60T 2270/82; B60T 8/261; F16D 2121/24; F16D 2123/00
  See application file for complete search history.

(56) References Cited

U.S. PATENT DOCUMENTS

| | | | |
|---|---|---|---|
| 7,497,528 B2 | 3/2009 | Reuter et al. | |
| 2003/0006726 A1* | 1/2003 | Weiberle | B60T 17/18 318/370 |
| 2007/0188018 A1* | 8/2007 | Reuter | B60T 8/4081 303/114.1 |
| 2008/0289922 A1* | 11/2008 | Hofmann | F16D 65/22 188/325 |
| 2013/0226425 A1* | 8/2013 | Oliveira | B60T 7/122 701/70 |
| 2015/0144438 A1* | 5/2015 | Park | F16D 65/18 188/72.1 |
| 2017/0217417 A1* | 8/2017 | Baehrle-Miller | B60T 13/741 |
| 2018/0079398 A1* | 3/2018 | Baehrle-Miller | B60T 7/12 |
| 2018/0079403 A1* | 3/2018 | Masuda | B60T 8/172 |
| 2019/0322249 A1 | 10/2019 | Di Stefano et al. | |
| 2020/0114891 A1* | 4/2020 | Pasquet | B60T 13/588 |
| 2020/0211789 A1 | 7/2020 | Kolmonen et al. | |

FOREIGN PATENT DOCUMENTS

| | | |
|---|---|---|
| CN | 102224043 A | 10/2011 |
| CN | 107685724 A | 2/2018 |
| EP | 1818235 A1 | 8/2007 |
| EP | 3178712 A1 | 6/2017 |
| WO | WO2018/116265 A1 | 6/2018 |

OTHER PUBLICATIONS

Chinese Patent Office Search Report for Application No. 201980076020.8, dated Feb. 11, 2023, 6 pages, China.

* cited by examiner

AUTOMATIC CONTROLLED BRAKE-BY-WIRE BRAKING SYSTEM FOR MOTORCYCLES

FIELD OF APPLICATION

The present invention relates to an automatic controlled brake-by-wire braking system for motorcycles.

PRIOR ART

A "Brake by Wire" brake system is a system that, compared to traditional hydraulic brake systems, has a decoupling between the brake pedal and the actuators; the braking request of the driver exerted by means of a brake pedal is transduced into signals managed by a control unit capable of driving electro-hydraulic and/or electromechanical actuators.

One of the problems with this type of system is that of not being able to ensure normal operation in the presence of some faults, such as the loss of power supply which would compromise the service braking function.

Some solutions of the prior art envisage the use of valves which, in the event of an electrical fault, automatically restore the connection between the actuators and the manual actuation device, so that the driver can still exert the required braking action.

Therefore, under standard operating conditions, the user generates a pressure by acting on the manual control and a control system interprets this pressure request, transforming it into a corresponding pressure and braking action in the connected brake system. In this way, the user does not have direct control over the brake system, but there is always a control unit with corresponding actuators that translate the user's manual action into a corresponding request for braking action and, therefore, into hydraulic pressure and braking action, in the connected brake system.

The direct control of the system by the user is then restored only in the event of an electrical fault or malfunction of one or more components of the automatic activation system: in this case, in order to ensure the user's safety and to ensure the braking capacity of the system, the system immediately restores the direct connection between the manual actuation of the user and the braking devices.

The prior art systems, while ensuring the functionality and safety of the system in the event of a fault, are rather complex and expensive to be implemented.

Furthermore, it is known to provide devices for controlling the braking force set by the user acting on the relative manual controls, such as for example levers and/or pedals.

Such control devices have, for example, the function of avoiding that due to an excessive braking action requested by the user, the vehicle may incur in the blocking of one or more wheels which would compromise the stability and control thereof.

These situations are all the more dangerous the more the vehicle is on poorly adherent surfaces, such as slippery or wet; in the case of motorcycles these situations are critical, regardless of the road surface, when the motor vehicle is in a bent condition, typically when cornering.

Moreover, these control devices can also be used for a dynamic control of the stability of the vehicle: it is in fact known that by applying a suitable braking force on individual wheels, or for example by modifying the distribution of the braking force on distinct axles of the vehicle, it is possible to generate yaw moments that can correct the trajectory of the vehicle, improving its dynamic control.

The solutions of the prior art typically provide anti-lock systems, known as ABS systems, which act on brake systems equipped with hydraulic circuits, substantially intervening on the pressure of the hydraulic circuit of the braking system so as to reduce the hydraulic pressure and therefore the braking force on the single wheel subject to momentary locking. The same operation is used in order to vary the braking force between different axles of the vehicle in a variable manner. It is also possible, as mentioned above, to impose a braking torque on individual wheels of the vehicle, in order to correct its trajectory and improve its dynamic stability.

The prior art solutions have some drawbacks.

First of all, the hydraulically actuated braking devices have residual torque problems, i.e., even after the release of the manual actuation control of the device, whether lever-operated or pedal-operated, the braking device exerts a residual braking torque. In fact, the thrust pistons of the pads, following the release of the manual actuation control, do not return completely to the rear position so that the pads tend to remain in contact with the discs, exerting a residual braking torque on the wheel firmly connected to the discs themselves.

Solutions exist to facilitate the retraction of the pistons following the release of the manual control, commonly known as 'roll back', but such solutions, which include for example return springs for the pistons, are not always effective, especially over time.

Moreover, the hydraulically actuated braking devices following the system operating temperature tend to modify their behavior, for example requiring an additional actuation stroke for the same braking action provided.

This behavior is often perceived negatively by the user who instead would like an always constant and repeatable braking action, for the same force exerted and the driving stroke produced on the pedal or operating lever.

Furthermore, with the hydraulically actuated braking devices of the prior art, the intervention of the anti-locking devices (ABS) or stability control devices is perceived by the user on the respective manual braking control, whether it is a lever or a pedal. This perception is not always appreciated by the user, who clearly feels pulsations at the manual control corresponding to pressure variations induced in the hydraulic system following the intervention of the braking and/or vehicle correction devices.

DISCLOSURE OF THE INVENTION

The need of solving the drawbacks and limitations mentioned with reference to the prior art is therefore felt.

In particular, the need is felt to provide a braking system that is effective in controlling the braking of the wheels in all conditions of use, avoiding dangerous locking, and allowing effective and prompt action to be taken on the stability control of the vehicle. This system must also be able to always provide the user with precise feedback on the behavior of the system, in terms of repeatability of the braking force imposed by manually operating the lever or the actuation pedal. Furthermore, this braking system must be able to intervene effectively on the braking control and stability of the vehicle without providing the user with annoying vibrations upon manual control.

Summarizing again, it is felt in the art the need to provide a braking system for vehicles that is able to provide a precise and reliable braking control and stability, and at the same time that provides the user with a feeling of reliability and constancy of operation (i.e. repeatability of performance) in all operating conditions.

Furthermore, this system must be as simple and cost-effective as possible to be implemented.

This requirement is met by a braking system for motorcycles according to claim 1.

In particular, this need is met by a braking system for motorcycles comprising:

- a first manual actuator device, operable by means of a lever and/or a pedal, selectively connectable to at least a first braking device placed on a front axle of the vehicle, and/or at least a second braking device placed on said front axle or on a rear axle of the motorcycle, each braking device acting on a relative brake disc or drum,
- the first manual actuator device being provided with a hydraulic supply circuit that can be selectively connected to a hydraulic input circuit of at least one of said braking devices by means of a control valve, said control valve being positioned in an operating position, in which it hydraulically disconnects the first manual actuator device from the braking devices, and in an electrical fault position, in which it hydraulically connects the first manual actuator device with at least one of said braking devices,
- at least one electro-hydraulic automatic actuator device fluidly connectable to the hydraulic input circuit of at least one of said braking devices for the respective hydraulic actuation thereof,
- at least one electromechanical automatic actuator device associated with at least one of said braking devices not provided with a hydraulic input circuit,
- the electro-hydraulic automatic actuator devices being associated with the front axle and the electromechanical automatic actuator devices being associated with the rear axle of the motorcycle or vice versa,
- a single control unit operatively connected to the control valve, to the at least one electro-hydraulic automatic device, to the at least one electromechanical automatic actuator device and to the first manual actuator device so as to operate said electro-hydraulic and electromechanical automatic actuator devices and said control valve according to the position or configuration of the first manual actuator device and/or according to the dynamics of the motorcycle.

According to an embodiment, the system comprises an electro-hydraulic automatic actuator device fluidly connected to a hydraulic input circuit of a braking device arranged on the rear axle and at least one electromechanical automatic actuator device connected to a relative braking device arranged on the front axle of the vehicle.

According to an embodiment, the system comprises an electro-hydraulic automatic actuator device fluidly connected to a hydraulic input circuit of at least one braking device arranged on the front axle and at least one electromechanical automatic actuator device connected to a relative braking device arranged on the rear axle of the vehicle.

According to an embodiment, said control valve is arranged upstream of the electro-hydraulic automatic actuator device and wherein the hydraulic supply circuit flows into a delivery volume of the electro-hydraulic actuator device fluidly connected with the hydraulic input circuit.

According to an embodiment, the control valve is arranged downstream of the electro-hydraulic automatic actuator device and upstream of the hydraulic input circuit.

According to an embodiment, the control valve is controlled by the control unit so as to fluidly connect the hydraulic input circuit with the hydraulic supply circuit or a delivery volume of the electro-hydraulic actuator device.

According to an embodiment, the control valve is provided with a pair of non-return valves, in which a first non-return valve allows the discharge of any residual pressure left in the automatic hydraulic actuator devices, a second non-return valve has a filling function through connection with a brake fluid reservoir.

According to an embodiment, at least one of said braking devices is provided with an electric parking brake device configured to ensure parking of the vehicle.

According to an embodiment, each of the braking devices is provided with an electric parking brake device configured to ensure parking of the vehicle.

According to an embodiment, the first manual actuator device, operable by means of a lever and/or a pedal, is connected to a passive simulator, through a shut-off valve which selectively connects or disconnects the first manual actuator device from the passive simulator.

According to an embodiment, the first manual actuator device is provided with at least one stroke or angle sensor, operatively connected to said single control unit so as to provide the latter with parameters to be interpreted and converted into actuation signals for the automatic actuator devices.

According to an embodiment, the first manual actuator device is equipped with at least one pressure sensor, operatively connected to said single control unit so as to provide the latter with parameters to be interpreted and converted into actuation signals for the automatic actuator devices.

According to an embodiment, the first manual actuator device is a hydraulic pump, provided with at least a brake fluid reservoir provided with a fluid level sensor inside it, so as to estimate the wear of the pads of the braking devices.

According to an embodiment, at least one of said electromechanical automatic actuator devices comprises an electric motor kinematically connected to a pusher of the corresponding braking device, said pusher being mechanically associated with a friction element such as a pad or a jaw of the braking device suitable to exert a braking action on an associable brake disc or drum respectively.

According to an embodiment, the electric motor is connected to said pusher by means of a kinematic system comprising means suitable for transforming a rotational motion of the electric motor into a translational motion of the pusher.

According to an embodiment, said kinematic system that connects at least one electric motor to a pusher comprises rotation sensors of the electric motor and displacement sensors of the pusher, in order to provide the control unit with data on the effective actuation of the corresponding braking device.

According to an embodiment, said at least one kinematic system that connects at least one electric motor to a pusher is reversible, so as to allow the automatic cancellation of the braking action following the deactivation of the actuator devices.

According to an embodiment, at least one kinematic system connecting at least one electric motor to a pusher is of an irreversible type, so as to ensure the maintenance of the braking action even following the deactivation of the actuator devices.

According to an embodiment, at least one of the electro-hydraulic automatic actuator devices comprises an electric motor kinematically connected to a pump fluidly connected, by means of the hydraulic input circuit, to at least one braking device, the pump exerting a pressure that actuates the braking device.

According to an embodiment, the control unit is programmed so as to realize, alternately or jointly for each electro-hydraulic and/or electromechanical automatic actuator device, the steps of:

- generating a braking action or increasing the braking action of each braking device of the system, in order to perform stability control of the vehicle, even in the absence of a request for braking action by the first manual actuator device,
- controlling the braking action of the braking system so as not to further operate the braking devices regardless of the actual braking request of the user,
- reducing or cancelling the braking action on each braking device, in case of incipient jamming phenomena or vehicle instability.

DESCRIPTION OF THE DRAWINGS

Further features and advantages of the present invention will appear more clearly from the following description of preferred non-limiting embodiments thereof, in which.

Elements or parts of elements in common to the embodiments described below are referred to with the same reference numerals.

DETAILED DESCRIPTION

Figure 1:
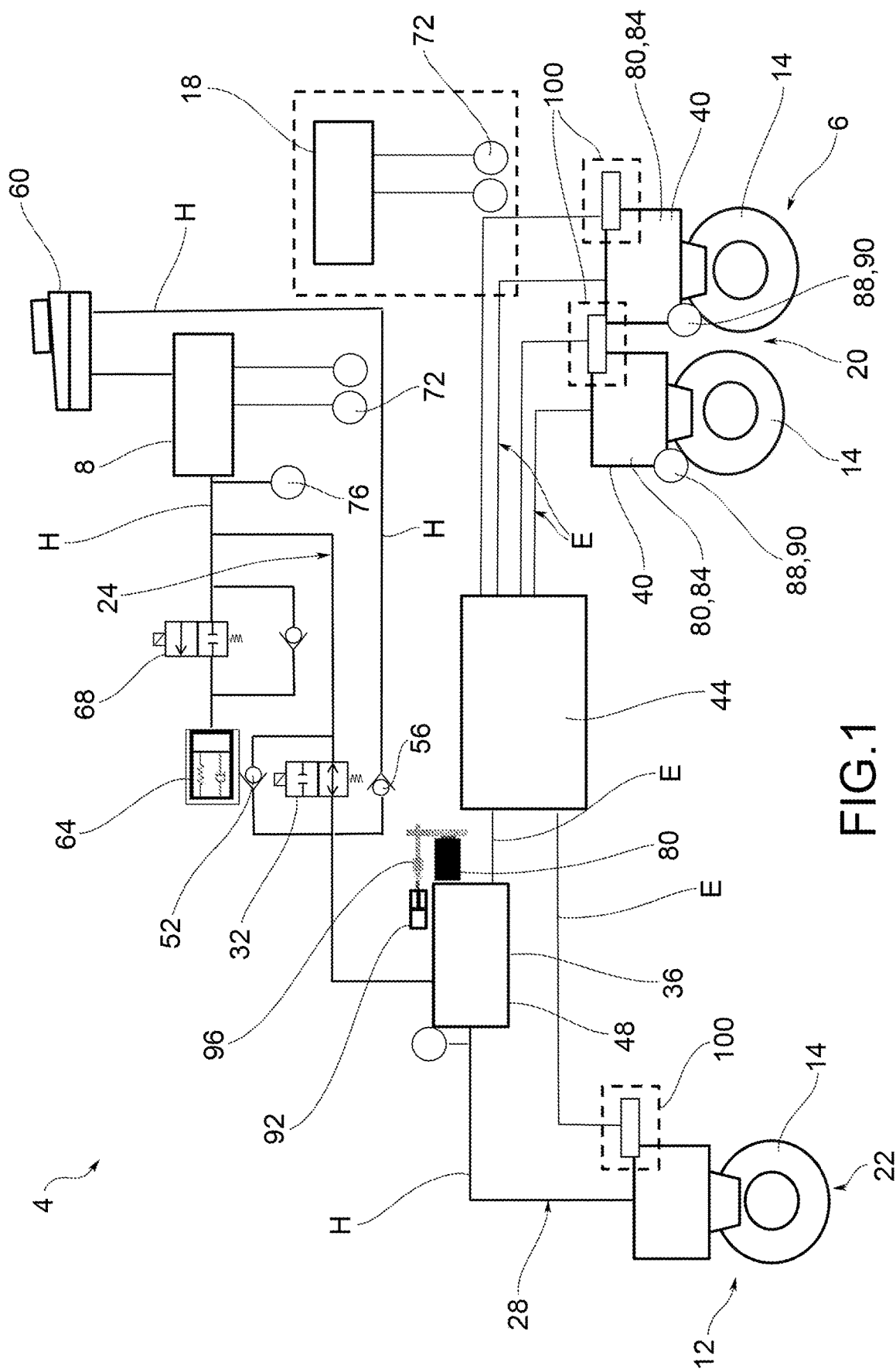
FIGS. 1-4 shows schematic views of brake systems according to possible variants of embodiments of the present invention.

With reference to the above figures, reference numeral 4 globally denotes a brake-by-wire braking system for vehicles, in particular for motorcycles.

The definition of motorcycle must be understood in a non-limiting manner, preferably referring to, but not limited to, motorcycles with 2 or more wheels.

The braking system 4 comprises a first manual actuator device 8, operable by means of a lever and/or a pedal, selectively connectable to at least a first braking device 12 placed on a front axle 16 of the motorcycle, and/or at least a second braking device 20 placed on said front axle 16 or on a rear axle 22 of the motorcycle.

Each braking device 12, 20 acts on a relative brake disc 14 (in the case of a disc brake) or drum (in the case of a drum brake, not shown).

The first manual actuator device 8 is provided with a hydraulic supply circuit 24 selectively connectable to a hydraulic input circuit 28 of at least one of said braking devices 12, 20 by means of a control valve 32.

The control valve 32 can be positioned in an operating position, in which it hydraulically disconnects the first manual actuator device 8 from the braking devices 12, 20, and in an electrical fault position, in which it hydraulically connects the first manual actuator device 8 with at least one of said braking devices 12, 20. As better described below, the operating condition corresponds to the standard operation of the brake-by-wire type braking system, while the electrical fault condition represents an extreme case in which, due to a malfunction of the braking system 4, in any case it ensures the braking action through the standard manual action.

The braking system 4 comprises at least one electro-hydraulic automatic actuator device 36 fluidly connectable to the hydraulic input circuit 28 of at least one of said braking devices 12, 20 for the respective hydraulic actuation thereof, and at least one electromechanical automatic actuator device 40 associated with at least one of said braking devices 12, 20 not provided with a hydraulic input circuit 28.

In other words, the electro-hydraulic automatic actuator device 36 is associated with braking devices provided with hydraulic actuation and therefore with the hydraulic input circuit 28, while the electrohydraulic automatic actuator device 40 is associated with braking devices without a hydraulic input circuit.

Figure 2:
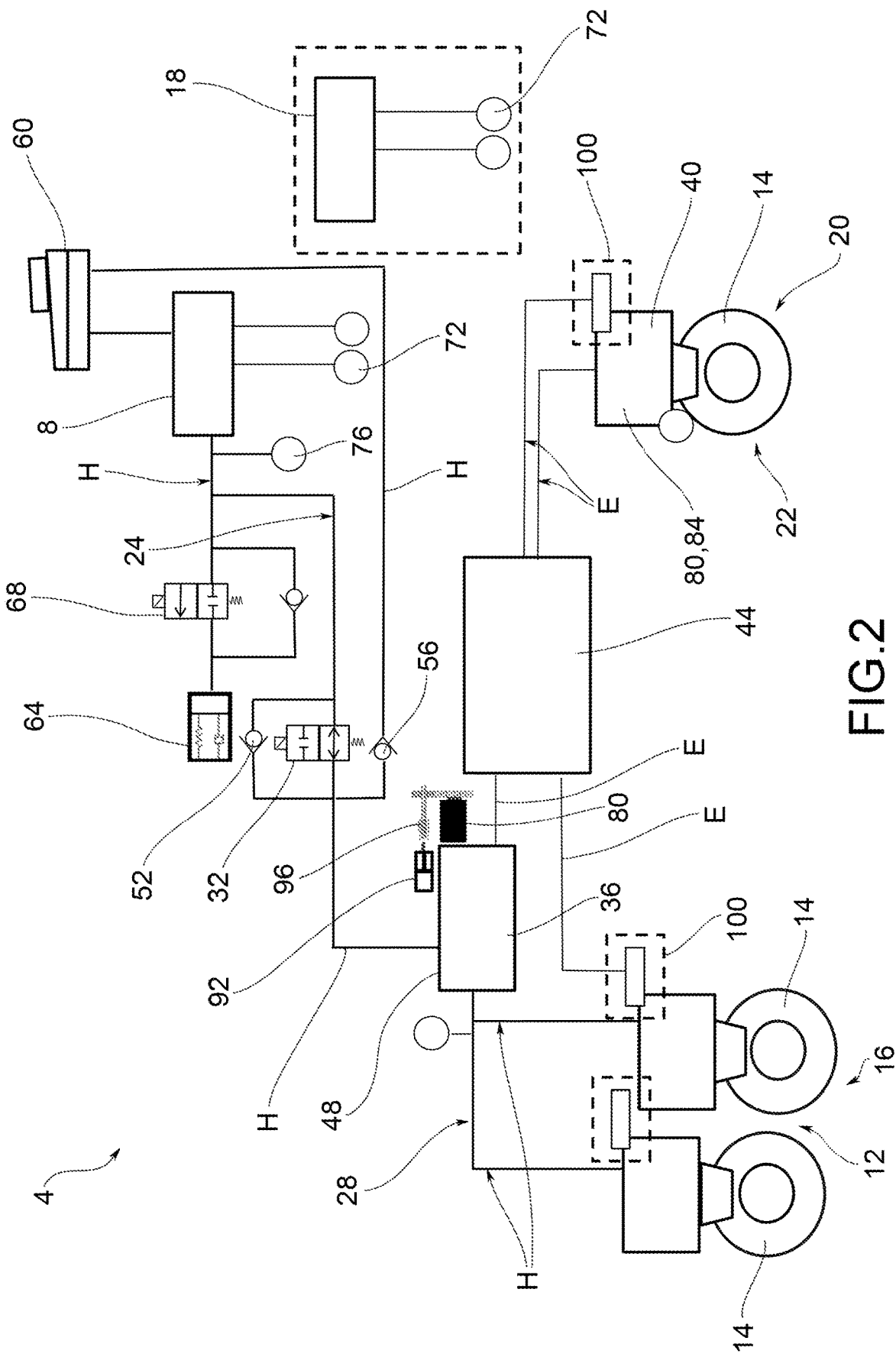
Figure 3:
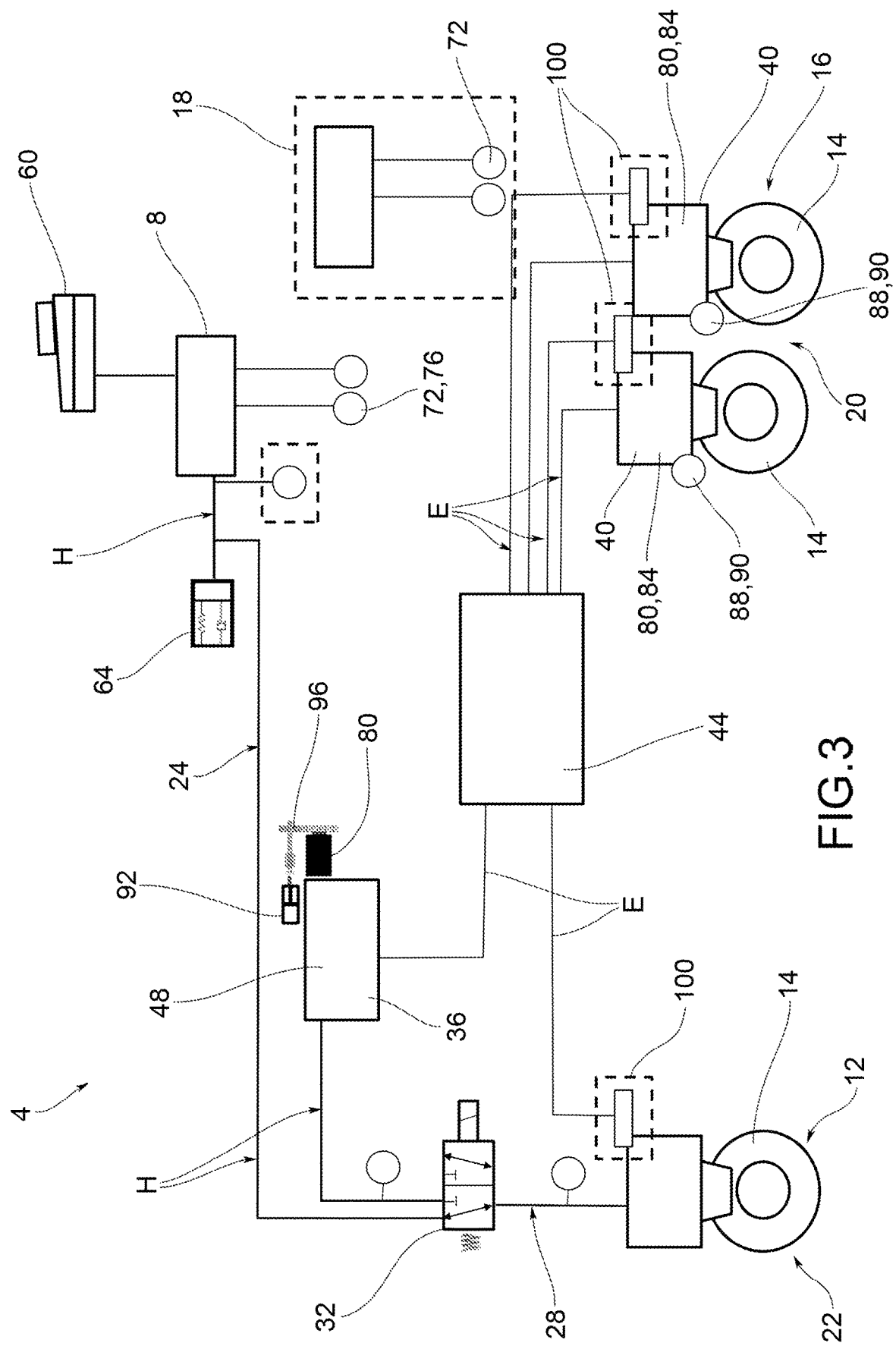
Figure 4:
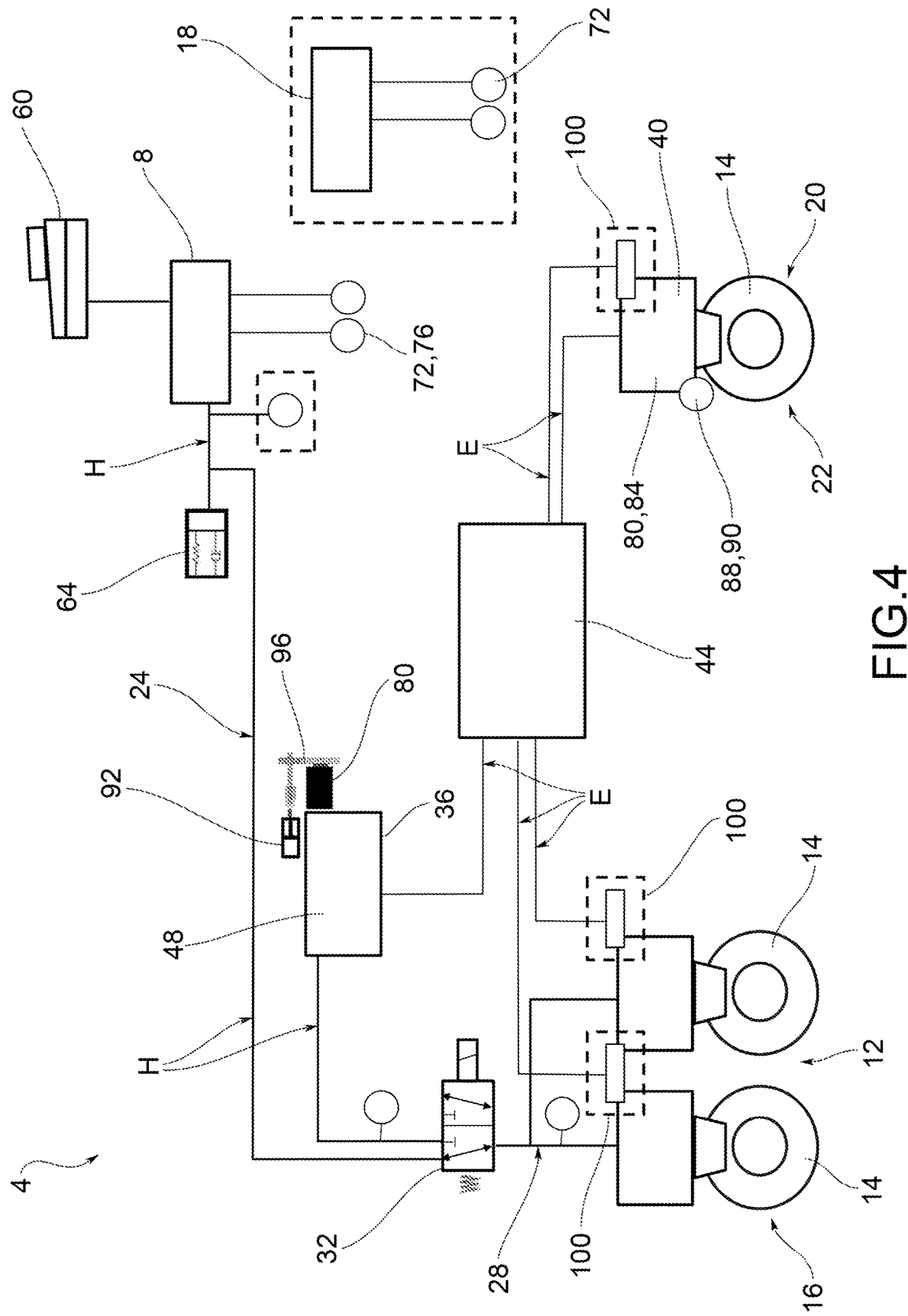

The electro-hydraulic automatic actuator devices 36 are associated with the front axle 16 and the electromechanical automatic actuator devices 40 are associated with the rear axle 22 of the motorcycle (FIGS. 2 and 4) or vice versa (FIGS. 1 and 3).

Typically, but not exclusively, at the front axle 16 there are provided at least two braking devices coupled to the same front wheel of the vehicle (for example a pair of disc brake calipers associated with a pair of brake discs keyed onto the front wheel), while only one braking device is provided on the rear axle 22.

The braking system 4 comprises a single control unit 44 operatively connected to the control valve 32, to the at least one electro-hydraulic automatic device 36, to the at least one electromechanical automatic actuator device 40 and to the first manual actuator device 8 so as to operate said electro-hydraulic 36 and electromechanical 40) automatic actuator devices and said control valve 32 according to the position or configuration of the first manual actuator device 8 and/or according to the dynamics of the motorcycle, as better described below.

According to a possible embodiment (FIGS. 1 and 3), the braking system 4 comprises an electro-hydraulic automatic actuator device 36 fluidly connected to a hydraulic input circuit 28 of a braking device 12, 20 arranged on the rear axle 22 and at least one electromechanical automatic actuator device 40 connected to a relative braking device 12, 20 arranged on the front axle 16 of the vehicle.

According to a further embodiment (FIGS. 2 and 4), the braking system 4 comprises an electro-hydraulic automatic actuator device 36 fluidly connected to a hydraulic input circuit 28 of at least one braking device 12, 20 arranged on the front axle 16 and at least one electromechanical automatic actuator device 44 connected to a relative braking device 12, 20 arranged on the rear axle 22 of the vehicle.

For greater understanding, the hydraulic connections within the systems illustrated in the figures are marked with the reference H, while the electrical/electronic connections are marked with the reference E.

The control valve 32 may be placed according to two different configurations.

According to a first configuration (FIGS. 1-2), said control valve 32 is arranged upstream of the electro-hydraulic automatic actuator device 36 and the hydraulic supply circuit 24 flows into a delivery volume 48 of the electro-hydraulic automatic actuator device 36 fluidly connected with the hydraulic input circuit 28.

In this configuration, the control valve 32 is controlled by the control unit 44 so as to fluidly connect and disconnect alternately the hydraulic input circuit 28 with the hydraulic supply circuit 24.

According to the second configuration (FIGS. 3-4), the control valve 32 is arranged downstream of the electro-hydraulic automatic actuator device 36 and upstream of the hydraulic input circuit 28.

In this configuration, the control valve 32 is controlled by the control unit 44 so as to fluidly connect the hydraulic input circuit 28 with the hydraulic supply circuit 24 and with the delivery volume 48 of the electro-hydraulic automatic actuator device 36.

According to a possible embodiment (FIGS. 1-2), the control valve 32 is provided with a pair of non-return valves 52, 56, in which a first non-return valve 52 allows the discharge of any residual pressure left in the electro-hydraulic automatic actuator devices 36, and a second non-return valve 56 has a filling function through connection with a brake fluid reservoir 60.

Preferably, the first manual actuator device 8 is a hydraulic pump, provided with at least a brake fluid reservoir 60 provided with a fluid level sensor inside it, so as to estimate the wear of the pads of the braking devices 12, 20.

The brake fluid reservoir 60 contains the same brake fluid contained within the hydraulic supply circuit 24 and the hydraulic input circuit 28. The purpose of said brake fluid reservoir 60 is to continuously supply brake fluid to the hydraulic supply circuit 24 and to the hydraulic input circuit 28 so as to compensate for the consumption of friction material inside the braking devices 12, 20.

According to a possible embodiment, the first manual actuator device 8, operable by means of a lever and/or a pedal, is connected to a passive simulator 64, through a shut-off valve 68 which selectively connects or disconnects the first manual actuator device 8 from the passive simulator 64.

By passive simulator we mean any simulator device capable of reproducing the resistance provided to the user when the latter requires a braking action through, for example, manual operation of a lever or pedal.

In particular, during standard operation, i.e. by-wire type, the shut-off valve 68 connects the first manual actuator device 8 with the passive simulator 64: in this way, the user does not exercise any direct action on the braking devices which are instead all are operated through the automatic actuator devices 36, 40.

In the event of an electrical fault, the shut-off valve 68 disconnects the first manual actuator device 8 from the passive simulator 64 and connects the first manual actuator device with the hydraulic supply circuit 24 and with the hydraulic input circuit 28: in this way, the user can exert a direct action on the braking devices, by-passing the automatic actuator devices 36, 40.

According to a possible embodiment, the first manual actuator device 8 is provided with at least one stroke or angle sensor 72, operatively connected to said single control unit 44 so as to provide the latter with parameters to be interpreted and converted into actuation signals for the automatic actuator devices 36, 40.

It is also possible to provide the first manual actuator device 8 with at least one pressure sensor 76, operatively connected to said single control unit 44 so as to provide the latter with parameters to be interpreted and converted into actuation signals for the automatic actuator devices 30, 40.

The automatic actuator devices 36, 40 can be of various types.

According to a possible embodiment, at least one of said electromechanical automatic actuator devices 40 comprises an electric motor 80 kinematically connected to a pusher 84 of the corresponding braking device 12, 20, said pusher 84 being mechanically associated with a friction element such as a pad or a jaw of the braking device 12, 20 suitable to exert a braking action on an associable brake disc 14 or drum, respectively.

For example, the electric motor 80 is connected to said pusher 84 by means of a kinematic system comprising means suitable for transforming a rotational motion of the electric motor 80 into a translational motion of the pusher 84.

Said kinematic system that connects at least one electric motor 80 to a pusher 84 may comprise rotation sensors 88 of the electric motor 80 and displacement sensors 90 of the pusher 84, in order to provide the control unit 44 with data on the effective actuation of the corresponding braking device 12, 20.

According to an embodiment, said at least one kinematic system that connects at least one electric motor 80 to a pusher 84 is reversible, so as to allow the automatic cancellation of the braking action following the deactivation of the automatic actuator devices 36, 40.

It is also possible to contemplate that said at least one kinematic system connecting at least one electric motor 80 to a pusher 84 is of an irreversible type, so as to ensure the maintenance of the braking action even following the deactivation of the automatic actuator devices 36, 40.

Also the electro-hydraulic automatic actuator devices 36 may be of various types.

For example, at least one of the electro-hydraulic automatic actuator devices 36 comprises an electric motor 80 kinematically connected to a pump 92, for example by means of a gear system 96.

Said pump 92 is fluidly connected, by means of the hydraulic input circuit 28, to at least one braking device 12, 20, so that the pump 92 exerts a pressure which actuates the braking device 12, 20.

The pump in turn sends brake fluid under pressure to the hydraulic input circuit 28 through the delivery volume 48.

According to a possible embodiment, at least one of said braking devices 12, 20 is provided with an electric parking brake device 100 configured to ensure parking of the vehicle.

Preferably, each of the braking devices 12, 20 is provided with an electric parking brake device configured to ensure parking of the vehicle.

The braking system according to the present invention may also be provided with a second manual actuator device 18, not connected to the hydraulic supply circuit 24, but operatively connected to the electric actuators of the electro-hydraulic automatic actuator devices 36 and/or to the electromechanical automatic actuator devices 40.

Said second manual actuator device 18 may in turn be provided with a stroke or angular sensor 72.

As mentioned above, the control unit 44 manages and controls the operation of the various devices of the braking system 4.

For example, the control unit 44 is programmed so as to realize, alternately or jointly for each electro-hydraulic 36 and/or electromechanical 40 automatic actuator device, the steps of:
  generating a braking action or increasing the braking action of each braking device 12, 20 of the braking system 4, in order to perform stability control of the vehicle, even in the absence of a request for braking action by the first manual actuator device 8,
  checking the braking action exerted by the brake system 4 so as not to further actuate the braking devices 12, 20 irrespective of the actual request for braking action by the user, thus preventing the onset of blocking phenomena of the wheels,
  reducing or cancelling the braking action on at least one or each braking device 12, 20, in the event of the occurrence of blocking or instability phenomena of the vehicle.

In this way, the control unit 44 is able to perform both a passive control and an active control of the stability of the vehicle, acting appropriately on the electro-hydraulic 36 and/or electromechanical 40 automatic actuator devices to correct the braking mode manually set by the user or impose a braking mode in order to better control the dynamic behavior of the vehicle.

As can be appreciated from the foregoing, the brake system according to the invention overcomes the drawbacks of the prior art.

In particular, the present invention allows a reduction in the costs and the architectural complexity of a traditional brake-by-wire system, as it allows avoiding a second source of redundant energy by making use of the driver's muscular energy for the emergency braking according to the legal regulations.

Advantageously, in the present invention the hydraulic backup connection is provided between the first manual actuator device and the electro-hydraulic actuators, passing through the volume containing brake fluid.

This architecture saves a control valve compared to known brake-by-wire solutions; moreover, it is sufficient that the valve used is sized to withstand much lower pressures than known solutions.

The system of the present invention allows simplifying and reducing the total number of components with respect to known brake-by-wire systems.

At the same time, each braking device is actuated by a corresponding independent automatic actuator device: in this way, both active and passive braking of each individual vehicle wheel can be controlled quickly and reliably.

Moreover, in this way it is possible, as seen, to adopt strategies to control the vehicle stability which are both passive, in the event of a braking request by the user, and active, in the event of identification of a condition of dynamic instability of the vehicle and relative correction by automatic and selective braking of individual vehicle wheels.

This system is also able to work effectively to control the stability of the vehicle both by reducing the braking action on individual wheels in locking conditions and by braking the individual wheels in order to generate yaw moments that can stabilize the vehicle, bringing it back into the optimal trajectory. The various actuators are in fact independent of each other and extremely fast in operating the braking devices.

This system is also able to always provide the user with precise feedback on the behavior of the system, in terms of repeatability of the braking force imposed by manually operating the lever or the actuation pedal.

In fact, the user never has the sensation of lengthening the stroke of the manual actuation devices, whether they are lever-operated or pedal-operated, since such actuation stroke/force is not connected to a hydraulic system, as in the solutions of the prior art, but is read and interpreted by the processing and control unit. Therefore the user always has a lever or pedal available which provides the same braking force for the same stroke/force set on the lever or pedal. Any change in the behavior of the braking devices, due for example to thermal expansion, is read, interpreted and compensated by the processing and control unit: the user has no perception of this variability in the operation of the system. In other words, to a specific stroke imposed by the user, and corresponding to a precise actuation force, the same braking force and therefore, deceleration, provided by the system always corresponds. If, for example, there were limit operating conditions for which the system is no longer able to guarantee constancy and repeatability of operation, the processing and control unit is able to detect the possible anomaly and signal it to the user, for example suggesting the vehicle stop to let the system cool down.

Therefore the braking conditions are perceived by the user in a constant and repeatable manner regardless of the fact that the braking system (meaning the actuator devices, the braking devices, the pads or jaws etc.) is cold or hot: the operating variables in fact can be automatically compensated by the processing and control unit.

Moreover, whenever the processing unit intervenes on the system for example to prevent locking of a wheel, the system corrects the braking action without providing the user with annoying vibrations upon the manual control.

In this way, the user always has the perception of repeatability, reliability and safety of the braking system.

In this way, the user always has the feeling of total control of the vehicle.

Moreover, the braking system according to the invention allows the customization or calibration by the user: it is in fact possible, by changing the settings, for example of the means for contrasting the actuating element, to increase or decrease the sensitivity of the braking system with the same force and/or stroke set by the user on the actuation element (lever or pedal). Moreover it is possible to modify at will the settings of the contrast means of the actuation element so as to modify the feedback provided on the actuation element for the same effective deceleration obtained.

It is also possible to change the settings of the processing and control unit in order to change the sensitivity and readiness of the braking system, with the same actuation by the user, depending on the environmental conditions, such as for example friction coefficient of the asphalt, depending on the load on the vehicle (minimum-maximum load), depending on the type of ride desired by the user (Touring, sport, wet, snow, etc.).

Moreover, the braking system according to the present invention allows active intervention on the dynamic stability control of the vehicle, generating braking forces on the individual wheels which induce yaw moments on the vehicle, in order to stabilize its trajectory. In fact, the processing and control unit, with the same braking or deceleration action imposed on the vehicle, is able to choose the best distribution of the braking action between the wheels of different axles. Moreover, the processing and control unit is able to avoid the occurrence of blocking phenomena on the individual wheels, by loosening the braking action on the wheels themselves, but also to prevent the wheels from slipping, applying braking forces on the wheel in case of incipient slipping.

Finally, it is also possible to prevent the raising of the rear wheel of the motorcycle, distributing the braking action more evenly between the axles, i.e. reducing the load transfer on the front which causes such a lifting. The system can obviously also work in reverse by applying a braking action on the rear wheel in order to avoid wheelies or lifting of the rear wheel, for example in the event of sudden acceleration.

Moreover, unlike what happens in braking systems having hydraulically actuated braking devices, with the system of the present invention there are no problems of residual braking torques. In fact, the return or retraction of the pushers always takes place automatically thanks to the interposition of reversible kinematic mechanisms; in any case it is always possible, unlike traditional hydraulic systems, to operate the kinematic mechanism in reverse in order to impose a backward movement of the same pushers.

The reversibility of the kinematic mechanism is also a safety element as it avoids the risk of dangerous locking of the wheel following the release of the brakes.

In any case, the presence of an irreversible kinematic mechanism is useful for example to guarantee the holding of a braking device for the parking brake: in this case it is instead useful that the kinematic mechanism is irreversible so that, following the release of the manual actuation element and the shut-down, for example of the engine, such a braking device used for parking braking is able to safely lock the wheel and therefore the vehicle.

Moreover, the system according to the present invention allows reducing the use of hydraulic systems for actuating the braking devices: in this way the load losses due to the conduits of the hydraulic system are limited, the fading phenomena due to hygroscopicity and/or to the heating of the fluid in the hydraulic circuit are reduced, and finally it is possible to eliminate the visible pipes, for example in motorcycles, so as to improve the aesthetics of the handlebar.

Moreover, the system of the present invention ensures safety and reliability even in the event of an electrical malfunction. In fact, the system is always able to provide an emergency actuation, of the manual type, so as to give the user the possibility of stopping the vehicle with a hydraulic-type actuation, both to perform an emergency/service braking and to perform a vehicle parking brake.

Therefore, in the event of an electrical malfunction, the system is always able to guarantee an emergency hydraulic actuation so that the vehicle can be safely stopped.

Any malfunctioning of the system is in any case extremely improbable thanks also to the redundancy of the power supply devices used to power the processing and control unit as well as the actuator devices.

A man skilled in the art, in order to meet contingent and specific requirements, may make several modifications and variants to the brake systems described above, all of which fall within the scope of the invention as defined by the following claims.

The invention claimed is:

1. A braking system for a motorcycle, comprising:
   a first manual actuator device selectively connectable to a first braking device placed on a front wheel on a front axle of the motorcycle, a second braking device placed on said front wheel, and a third braking device on a rear axle of the motorcycle, each braking device acting on a relative brake disc or drum,
   the first manual actuator device being provided with a hydraulic supply circuit that can be selectively connected to a hydraulic input circuit of at least one of said braking devices by means of a control valve, said control valve being positioned in an operating position, in which the control valve hydraulically disconnects the first manual actuator device from the braking devices, and in an electrical fault position, in which the control valve hydraulically connects the first manual actuator device with at least one of said braking devices,
   at least one electro-hydraulic automatic actuator device fluidly connectable to the hydraulic input circuit of at least one of said braking devices for the respective hydraulic actuation thereof,
   at least one electromechanical automatic actuator device associated with at least one of said braking devices not provided with a hydraulic input circuit,
   the electro-hydraulic automatic actuator devices being associated with the front axle and the electromechanical automatic actuator devices being associated with the rear axle of the motorcycle or vice versa,
   a single control unit operatively connected to the control valve to control the control valve to connect and disconnect the hydraulic supply circuit from the hydraulic input circuit for stability control of the motorcycle, to the at least one electro-hydraulic automatic actuator device, to the at least one electromechanical automatic actuator device and to the first manual actuator device so as to operate said electro-hydraulic and electromechanical automatic actuator devices and said control valve according to the position or configuration of the first manual actuator device and/or according to the dynamics of the motorcycle,
   a second manual actuator device, not connected to the hydraulic supply circuit, but operatively connected to the at least one electromechanical automatic actuator device and the at least one electro-hydraulic automatic actuator device,
   wherein the first or the second manual actuator devices have a stroke that can never be lengthened.

2. The braking system for vehicles according to claim 1, wherein the system comprises the electro-hydraulic automatic actuator device fluidly connected to the hydraulic input circuit of the third braking device and the at least one electromechanical automatic actuator device connected to the first braking device or the second braking device.

3. The braking system for the motorcycle according to claim 1, wherein the electro-hydraulic automatic actuator device is fluidly connected to the hydraulic input circuit of the first braking device arranged on the front axle and the at least one electromechanical automatic actuator device connected to the third braking device arranged on the rear axle of the motorcycle.

4. The braking system for the motorcycle according to claim 1, wherein said control valve is arranged upstream of the electro-hydraulic automatic actuator device and wherein the hydraulic supply circuit flows into a delivery volume of the electro-hydraulic automatic actuator device fluidly connected with the hydraulic input circuit.

5. The braking system for vehicles according to claim 1, wherein said control valve is arranged downstream of the electro-hydraulic automatic actuator device and upstream of the hydraulic input circuit.

6. The braking system for vehicles according to claim 5, wherein the control valve is controlled by the control unit so as to fluidly connect the hydraulic input circuit with the hydraulic supply circuit or a delivery volume of the electro-hydraulic actuator device.

7. The braking system for the motorcycle according to claim 1, in which the control valve is provided with a pair of non-return valves in which a first non-return valve allows the discharge of any residual pressure left in the automatic electro-hydraulic actuator devices, a second non-return valve has a filling function through connection with a brake fluid reservoir.

8. The braking system for the motorcycle according to claim 1, wherein at least one of said braking devices is provided with an electric parking brake device configured to ensure parking of the motorcycle.

9. The braking system for the motorcycle according to claim 1, wherein each of the braking devices is provided with an electric parking brake device configured to ensure parking of the motorcycle.

10. The braking system for the motorcycle according to claim 1, in which the first manual actuator device is connected to a passive simulator, through a shut-off valve which selectively connects or disconnects the first manual actuator device from the passive simulator.

11. The braking system for the motorcycle according to claim 1, wherein the first manual actuator device is provided with at least one stroke or angle sensor, operatively connected to said single control unit so as to provide the latter with parameters to be interpreted and converted into actuation signals for the automatic actuator devices.

12. The braking system for the motorcycle according to claim 1, wherein the first manual actuator device is equipped with at least one pressure sensor, operatively connected to said single control unit so as to provide the latter with parameters to be interpreted and converted into actuation signals for the automatic actuator devices.

13. The braking system for the motorcycle according to claim 1, in which the first manual actuator device is a hydraulic pump, provided with at least a brake fluid reservoir provided with a fluid level sensor inside it.

14. The braking system for the motorcycle according to claim 1, wherein at least one of said electromechanical automatic actuator devices comprises an electric motor kinematically connected to a pusher of the corresponding braking device, said pusher being mechanically associated with a friction element suitable to exert a braking action on an associable brake disc or drum respectively.

15. The braking system for the motorcycle according to claim 14, wherein the electric motor is connected to said pusher by means of a kinematic system comprising means suitable for transforming a rotational motion of the electric motor into a translational motion of the pusher.

16. The braking system for the motorcycle according to claim 15, wherein said kinematic system that connects the electric motor to the pusher comprises rotation sensors of the electric motor and displacement sensors of the pusher, in order to provide the control unit with data on the effective actuation of the corresponding braking device.

17. The braking system for the motorcycle according to claim 15, wherein said kinematic system that connects the electric motor to the pusher allows for the automatic cancellation of the braking action following the deactivation of the automatic actuator devices.

18. The braking system for the motorcycle according to claim 15, wherein the kinematic system connecting the electric motor to the pusher allows for the maintenance of the braking action even following the deactivation of the automatic actuator devices.

19. The braking system for the motorcycle according to claim 1, wherein at least one of the electro-hydraulic automatic actuator devices comprises an electric motor kinematically connected to a pump fluidly connected, by means of the hydraulic input circuit, to at least one braking device, the pump exerting a pressure that actuates the braking device.

20. The braking system for the motorcycle according to claim 1, wherein the control unit is programmed so as to realize, alternately or jointly for each electro-hydraulic and/or electromechanical automatic actuator device, the steps of: generating a braking action or increasing the braking action of each braking device of the system, in order to perform stability control of the motorcycle, even in the absence of a request for braking action by the first manual actuator device, controlling the braking action of the braking system so as not to further operate the braking devices regardless of the actual braking request of the user, reducing or cancelling the braking action on each braking device, in the event of the occurrence of blocking or instability phenomena of the motorcycle.

21. The braking system for the motorcycle according to claim 1, wherein the first and second manual actuating devices provide a constant braking force in response to a force on the manual actuating devices.

* * * * *